(12) United States Patent
Kuramochi et al.

(10) Patent No.: US 11,450,316 B2
(45) Date of Patent: Sep. 20, 2022

(54) AGENT DEVICE, AGENT PRESENTING METHOD, AND STORAGE MEDIUM

(71) Applicant: HONDA MOTOR CO., LTD., Tokyo (JP)

(72) Inventors: Toshikatsu Kuramochi, Tokyo (JP); Wataru Endo, Wako (JP); Ryosuke Tanaka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 476 days.

(21) Appl. No.: 16/559,816

(22) Filed: Sep. 4, 2019

(65) Prior Publication Data

US 2020/0111489 A1 Apr. 9, 2020

(30) Foreign Application Priority Data

Oct. 5, 2018 (JP) .............................. JP2018-189708

(51) Int. Cl.
*G10L 15/22* (2006.01)
*B60K 35/00* (2006.01)

(52) U.S. Cl.
CPC .............. *G10L 15/22* (2013.01); *B60K 35/00* (2013.01); *B60K 2370/148* (2019.05); *B60K 2370/149* (2019.05); *B60K 2370/1575* (2019.05); *G10L 2015/223* (2013.01); *G10L 2015/227* (2013.01)

(58) Field of Classification Search
CPC ....................................................... G10L 15/22
See application file for complete search history.

(56) References Cited

U.S. PATENT DOCUMENTS

2002/0015037 A1\* 2/2002 Moore .................... G06F 3/011
345/419
2019/0279629 A1\* 9/2019 Okamoto ................ G06F 40/20

FOREIGN PATENT DOCUMENTS

JP 2018-103880 7/2018

\* cited by examiner

*Primary Examiner* — Ibrahim Siddo
(74) *Attorney, Agent, or Firm* — Amin, Turocy & Watson, LLP

(57) ABSTRACT

An agent device includes a microphone which collects audio in a vehicle cabin, a speaker which outputs audio to the vehicle cabin, an interpreter which interprets the meaning of the audio collected by the microphone, a display provided in the vehicle cabin, and an agent controller which displays an agent image in a form of speaking to an occupant in a region of the display and causes the speaker to output audio by which the agent image speaks to at least one occupant, and the agent controller changes the face direction of the agent image to an direction different from an direction of the occupant who is a conversation target in a case that an utterance with respect to the face direction is interpreted by the interpreter after the agent image is displayed on the display.

13 Claims, 11 Drawing Sheets

AGENT DEVICE, AGENT PRESENTING METHOD, AND STORAGE MEDIUM

CROSS-REFERENCE TO RELATED APPLICATION

Priority is claimed on Japanese Patent Application No. 2018-189708, filed Oct. 5, 2018, the content of which is incorporated herein by reference.

BACKGROUND

Field of the Invention

The present invention relates to an agent device, an agent presenting method, and a storage medium.

Description of Related Art

Conventionally, a display system which includes a plurality of displays around a driver's seat and performs displaying of a map and a guidance of a navigation system, displaying of video content, or the like on a display set in advance from among the plurality of displays on the basis of an operation input such as setting the navigation system, selecting or playing content such as videos, or the like is known (for example, Japanese Unexamined Patent Application, First Publication No. 2018-103880).

SUMMARY

However, in the conventional technology, in a case that there is a plurality of occupants, a display result based on an operation input is unlikely to be displayed at a position at which an occupant who has performed the operation is able to easily visually recognize the display result. As a result, if the conventional technology is applied to a device which controls an agent image, an agent is likely to perform an unnatural behavior.

An object of embodiments of the present invention devised in view of the aforementioned circumstances is to provide an agent device which allows an agent to perform a natural behavior, an agent presenting method, and a storage medium.

An agent device, an agent presenting method, and a storage medium according to the present invention employ the following configurations.

(1): An agent device according to one aspect of the present invention includes: a microphone which collects audio in a vehicle cabin; a speaker which outputs audio to the vehicle cabin; an interpreter which interprets the meaning of the audio collected by the microphone; a display provided in the vehicle cabin; and an agent controller which displays an agent image in a form of speaking to an occupant in a region of the display in a state in which a face direction is recognizable and causes the speaker to output audio, wherein the agent controller changes the face direction of the agent image to an direction different from an direction of the occupant who is a conversation target in a case that an utterance with respect to the face direction is interpreted by the interpreter after the agent image is displayed on the display.

(2): In the aforementioned aspect of (1), the agent device includes a plurality of speakers, a sound image can be located through a combination of outputs of the plurality of speakers, and the agent controller displays the agent image in an area near the conversation target among one or more displays present in the vicinity of a plurality of occupants and controls the speakers such that a sound image is located at the display position of the agent image.

(3): In the aforementioned aspect of (2), the agent controller preferentially selects the occupant who is not a driver as the conversation target.

(4): In the aforementioned aspect of (3), the occupant preferentially selected as the conversation target is an occupant sitting on a passenger seat in the vehicle cabin.

(5): In the aforementioned aspect of (2), in a case that the interpreter further performs the interpretation with respect to the face direction of the agent image after the face direction of the agent image has been changed, the agent controller sets the face direction as non-directional.

(6): In the aforementioned aspect of (1), the agent controller changes the face direction in a case that the interpreter interprets that input of a name of the agent image has been repeatedly received.

(7): In the aforementioned aspect of (1), the agent controller changes the face direction in a case that an increase rate of the sound pressure of the audio received through the microphone is equal to or higher than a predetermined rate.

(8): In the aforementioned aspect of (1), the agent controller changes the face direction in a case that it is determined that an utterance interpreted by the interpreter has been interrupted halfway.

(9): In the aforementioned aspect of (1), the agent device further includes a camera which captures an image of the occupants, wherein the interpreter further interprets an image collected by the camera, in a case that speaking of an occupant to the agent image has been recognized, the agent controller displays the agent image in a state in which the agent image faces in at least a direction in which any occupant is present before the agent image replies to speaking of the occupant, the interpreter interprets images collected by the camera before and after the agent image is displayed in a state in which the agent image faces in at least a direction in which any occupant is present, and the agent controller changes the face direction if it is determined that a facial expression of the occupant has changed in a case that the agent image is displayed in a state in which the agent image faces in at least a direction in which any occupant is present.

(10): In the aforementioned aspect of (9), the agent controller changes the face direction in a case that a negative facial expression change of the occupant selected as a conversation target has been detected.

(11): In the aforementioned aspect of (1), the agent controller displays the agent image at one end of the display and displays the face direction of the agent image such that the face direction faces in a direction of the other end of the display.

(12): An agent presenting method according to one aspect of the present invention includes, a computer: collecting audio in a vehicle cabin; outputting audio to the vehicle cabin; interpreting the meaning of the collected audio; displaying an agent image in a form speaking to an occupant in a state in which a face direction is recognizable and outputting the audio; and changing the face direction of the agent image to an direction different from an direction of the occupant who is a conversation target in a case that an utterance with respect to the face direction is interpreted after the agent image is displayed.

(13): A storage medium according to one aspect of the present invention is a non-transitory computer-readable recording medium recording a vehicle control program causing an in-vehicle computer to: collect audio in a vehicle cabin; output audio to the vehicle cabin; interpret the meaning of the collected audio; display an agent image in a form speaking to an occupant in a state in which a face direction is recognizable and to output the audio; and change the face direction of the agent image to an direction different from an direction of the occupant who is a conversation target in a case that an utterance with respect to the face direction is interpreted after the agent image is displayed.

According to (1) to (13), it is possible to allow the agent to perform a natural behavior.

DESCRIPTION OF EMBODIMENTS

Hereinafter, embodiments of an agent device, an agent presenting method and a storage medium of the present invention will be described with reference to the drawings. An agent device provided in a vehicle and having an interactive agent function will be described as an example of the agent device in the following. For example, the agent device provides various types of information at the request of an occupant of a vehicle or controls devices in the vehicle while having a conversation with the occupant. The agent device may determine a state of the occupant from an expression or voice tone of the occupant and performs driving assistance or learn a lifestyle and tastes of the occupant and suggest choices in accordance with a situation. The agent device may cause a display to display, for example, an image (hereinafter referred to as an agent image) of a personified animal, character or the like in order to allow an occupant to visually recognize a conversation partner. The agent image includes, for example, a face image in which at least a viewer recognizes an expression or a face direction. For example, the agent image may be an image in which parts resembling eyes or a nose are represented in a facial region and a face direction is recognized on the basis of a position of the parts in the facial region. The agent image may be three-dimensionally sensed and include a head image in a three-dimensional space such that a face direction is recognized by a viewer. The agent device is realized, for example, using a natural language function (a process of understanding the structure and meaning of text), a conversation control process, a search process and the like in addition to an audio recognition process of recognizing audio of an occupant (a process of converting audio into text) in an integrated manner. Some or all of these processes may be realized by artificial intelligence (AI) technology. Some or all of components for performing these processes may be provided in a server device or the like which can communicate with a vehicle.

First Embodiment

[Overall Configuration]

Figure 1:
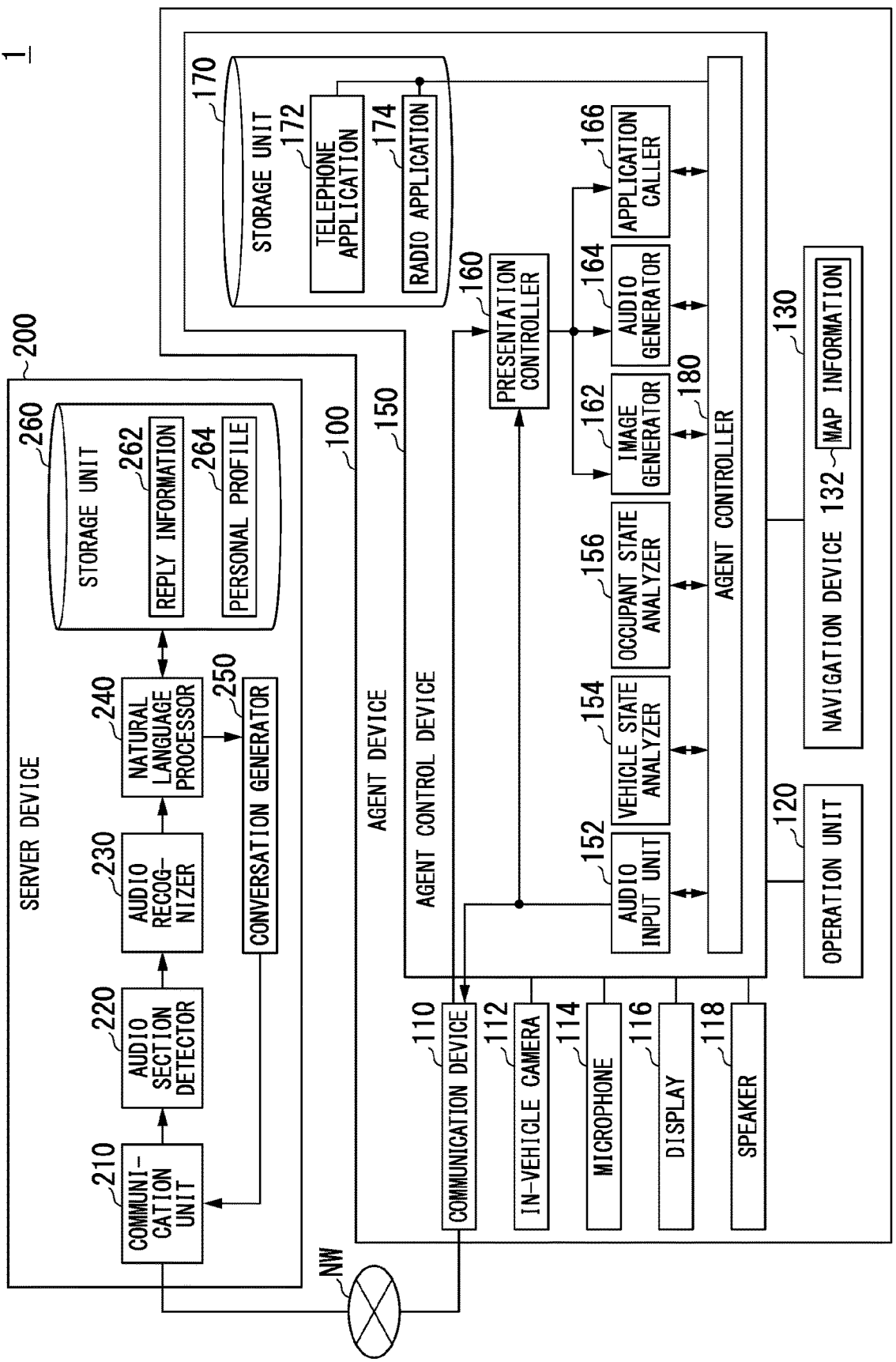
FIG. 1 is a block diagram of an agent system including an agent device according to an embodiment.

FIG. 1 is a block diagram of an agent system 1 including an agent device according to a first embodiment. The agent system 1 includes an agent device 100 and a server device 200. The agent device 100 and the server device 200 are connected in a state in which data can be transmitted and received through a network NW such as the Internet, a wide area network (WAN) or a local area network (LAN), for example. Although the server device 200 can communicate with a plurality of agent devices 100, it is assumed that the server device 200 communicates with one agent device 100 in the following description for convenience.

The agent device 100 performs a conversation with an occupant of a vehicle M, performs a request for an inquiry according to audio or the like from the occupant to the server device 200 and presents, to the occupant, a reply to the request obtained from the server device 200 in a predetermined output state. Although the occupant may be an occupant (hereinafter, a driver) who sits on a driver's seat, for example, in the following description, the occupant may be an occupant (fellow passenger) who sits on a passenger seat or a back seat in addition to (or instead of) the occupant who sits on the driver's seat.

The agent device 100 includes, for example, a communication device 110, an in-vehicle camera 112, a microphone 114, a display 116, a speaker 118, an operation unit 120, a navigation device 130, and an agent control device 150. These devices and equipment are connected through a multiplex communication line such as a controller area network (CAN) communication line, a serial communication line, a wireless communication network, or the like. Meanwhile, the components shown in FIG. 1 are merely an example and some of the components may be omitted or other components may be further added.

The communication device 110 communicates with other vehicles or the server device 200 through the network NW, for example, using a cellular network, a Wi-Fi network, Bluetooth (registered trademark), dedicated short range communication (DSRC) or the like.

The in-vehicle camera 112 captures an image including the face of an occupant who sits on a seat provided in the cabin of the vehicle M, for example. For example, the in-vehicle camera 112 may be a digital camera using a solid state imaging device such as a charge coupled device (CCD) or a complementary metal oxide semiconductor (CMOS). The in-vehicle camera 112 captures an image of an occupant at predetermined timings, for example. A captured image of the in-vehicle camera 112 is output to the agent control device 150.

The microphone 114 is an audio input device for collecting audio in the vehicle cabin. For example, the microphone 114 may be provided on a steering wheel. The microphone 114 may be provided in the vicinity of part in front in a case that an occupant sits on a seat in the vehicle cabin. For example, the microphone 114 may be provided on the steering wheel, an instrument panel or a seat.

The display 116 is provided in a vicinity in front of an occupant sitting on a seat in the vehicle cabin. The speaker 118 is provided in the vicinity of a seat in the vehicle cabin or the display 116. A plurality of displays 116 and a plurality of speakers 118 may be provided in the vehicle cabin.

Figure 2:
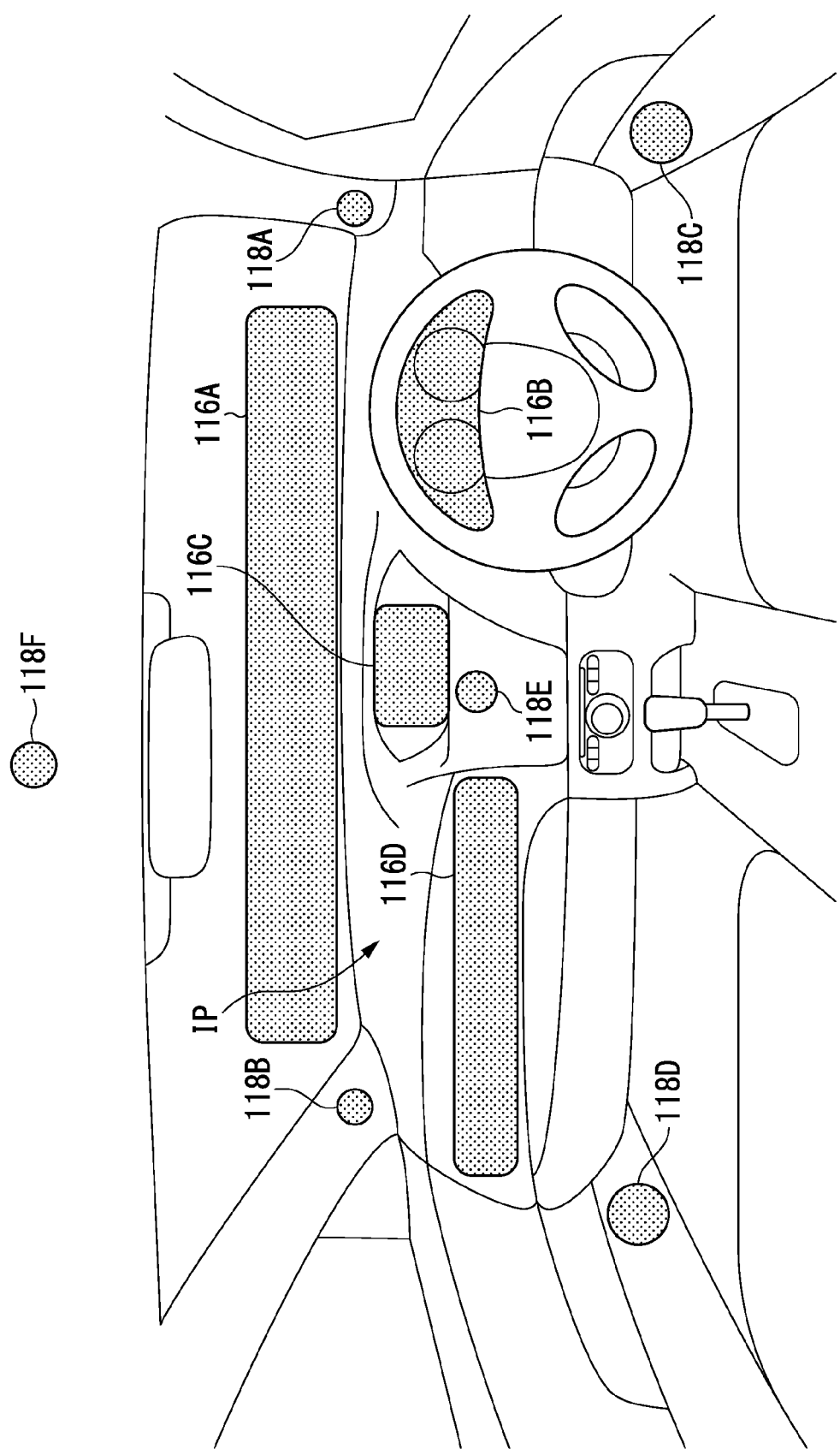
FIG. 2 is a diagram schematically showing displays and speakers provided in a vehicle.

FIG. 2 is a diagram schematically showing displays and speakers provided in the vehicle M. Displays 116A to 116D and speakers 118A to 118F are provided in the vehicle cabin of FIG. 2. The display 116A is a head-up display (HUD) device, for example. The HUD device is a device which causes an image to be overlaid on a landscape and is able to be visually recognized and, as an example, a device which allows an occupant to visually recognize a virtual image by projecting light including an image to a front windshield or a combiner of the vehicle M. Although an occupant who is subject able through the HUD device to visually recognize an image is mainly a driver or an occupant sitting on the passenger seat, they may be an occupant sitting on the back seat. The display 116A may be set in a lower region of the front windshield such that it does not obstruct a driver's view, for example. The display 116B displays an image associated with navigation processing performed by the navigation device 130, other images and the like.

The display 116B is provided in a vicinity in front of the driver's seat (e.g., a seat closest to the steering wheel) in the instrument panel IP and disposed at a position at which it can be visually recognized by an occupant through a hole in the steering wheel or over the steering wheel. The display 116B is a liquid crystal display (LCD), an organic electroluminescence (EL) display device, or the like, for example. The display 116B displays, for example, images of the speed, the engine RPM, the amount of remaining fuel, a radiator water temperature, the mileage and other information of the vehicle M.

The display 116C is provided in the vicinity of the center of the instrument panel IP. The display 116C is an LCD, an organic EL display device or the like, for example, like the display 116B. The display 116C displays, for example, an image associated with navigation processing performed by the navigation device 130, other images, and the like. In addition, the display 116C may display a television program, play a DVD and display content such as a downloaded movie.

The display 116D is provided in a vicinity in front of the passenger seat (seat next to the driver's seat) in the instrument panel IP. The display 116D displays a television program, plays a DVD and displays content such as a downloaded movie. A display which acquires information visually recognizable by an occupant through a side-view mirror of the vehicle M using a camera outside the vehicle and displays the acquired information may be provided in the vehicle cabin.

The speakers 118A and 118B may be provided on left and right window pillars (so-called A pillars) at the front of the vehicle M, for example. The speaker 118C is provided on the lower part of the door on the side of the driver's seat and the speaker 118D is provided on the lower part of the door on the side of the passenger seat. The speaker 118E is provided in the vicinity of the display 116C, that is, near the center of the instrument panel IP. The speaker 118F is provided in the vicinity of the center portion of the ceiling of the vehicle cabin.

Figure 3:
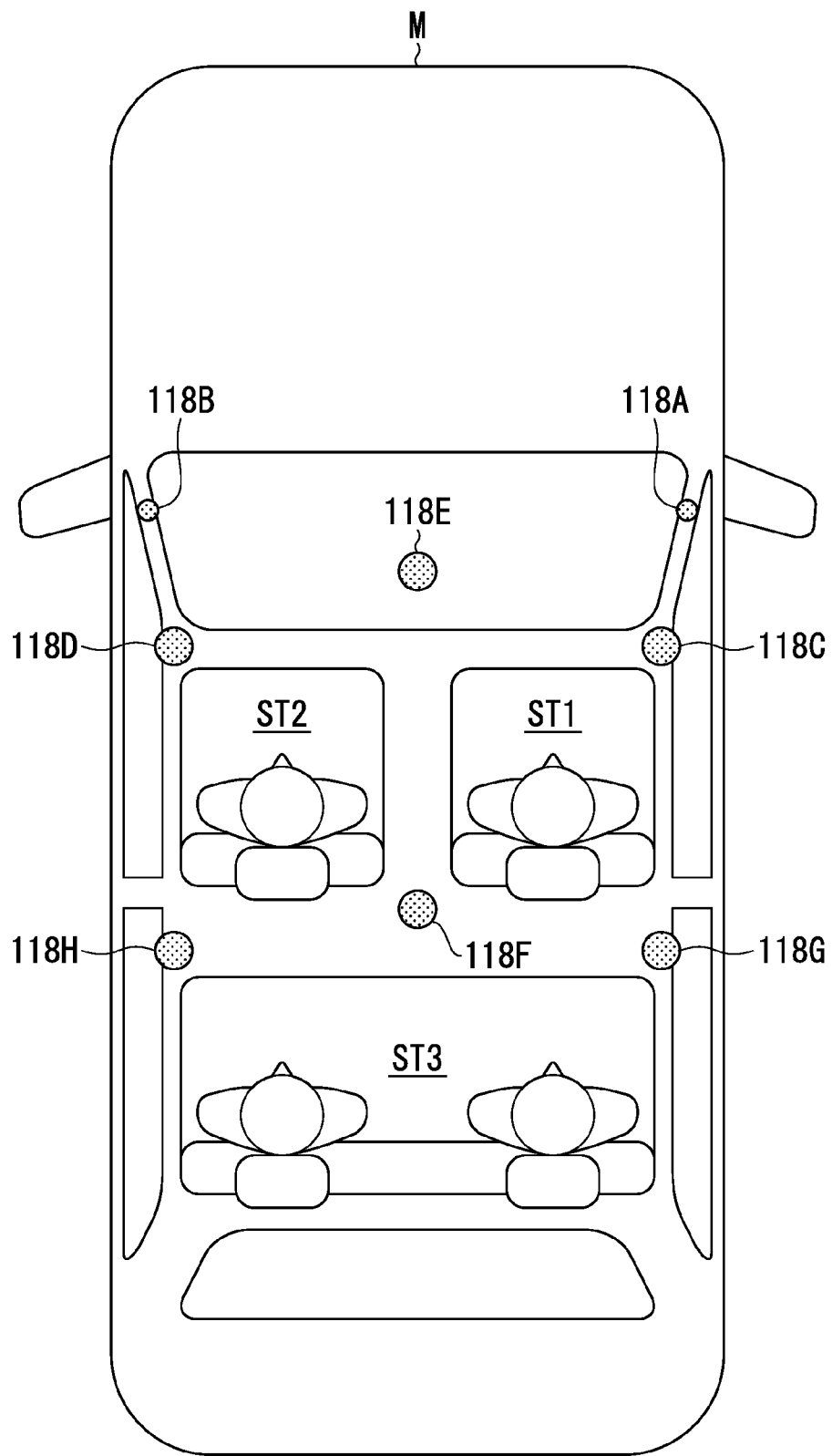
FIG. 3 is a diagram for describing positions of speakers in the vicinity of a back seat.

A speaker may be provided in the vicinity of the back seat in the vehicle M. FIG. 3 is a diagram for describing a position of a speaker in the vicinity of the back seat. In the example of FIG. 3, speakers 118G and 118H are provided in the vicinity of the back seat ST3 disposed behind the driver's seat ST1 and the passenger seat ST2 in addition to the speakers 118A to 118F shown in FIG. 2. Specifically, the speakers 118G and 118H are provided on the lower parts of left and right doors. A speaker 118 may be provided on a window pillar (so-called a B pillar) disposed between the front door and the rear door of the vehicle M or provided in the direction of the back seat.

The operation unit 120 receives a manual operation of an occupant. The operation unit 120 includes a switch, a button, a key and the like, for example. The operation unit 120 is provided, for example, on the steering wheel or the instrument panel. The operation unit 120 may be integrated with the display 116 as a touch panel.

The navigation device 130 identifies the location of the vehicle M on the basis of, for example, signals received from global navigation satellite system (GNSS) satellites. The navigation device 130 determines a route (hereinafter a route on a map) from the identified location of the vehicle M (or an input arbitrary location) to a destination input by an occupant using the operation unit 120 or the display 116 with reference to map information 132. For example, the map information 132 may be information representing road shapes according to links indicating roads and nodes connected through links. The map information 132 may include curvatures of roads, point of interest (POI) information and the like.

The navigation device 130 may perform route guidance using the display 116 and the speaker 118 on the basis of a route on a map. For example, the navigation device 130 may be realized by a function of a terminal device such as a smartphone or a tablet terminal of an occupant. The navigation device 130 may transmit a current location and a destination to the server device 200 or a navigation server through the communication device 110 and acquire a route equivalent to a route on a map from the server device 200 or the navigation server. The navigation device 130 may be a function of the agent control device 150.

[Agent Control Device]

The agent control device 150 includes, for example, an audio input unit 152, a vehicle state analyzer 154, an occupant state analyzer 156, a presentation controller 160, an image generator 162, an audio generator 164, an application caller 166, a storage unit 170, and an agent controller 180. These components are realized, for example, by a computer processor such as a central processing unit (CPU) executing a program (software). Some or all of these components may be realized by hardware (circuit part including circuitry) such as a large scale integration (LSI) circuit, an application specific integrated circuit (ASIC), a field-programmable gate array (FPGA) or a graphics processing unit (GPU) or realized by software and hardware in cooperation. The program may be stored in the storage unit 170 in advance or stored in a separable storage medium such as a DVD or a CD-ROM and installed in the storage unit 170 in a case that the storage medium is inserted into a drive device.

The audio input unit 152 receives an input of audio through the microphone 114. The audio input unit 152 transmits the received audio (audio stream) to the server device 200 through the communication device 110.

The vehicle state analyzer 154 analyzes a state of the vehicle on the basis of, for example, the location of the vehicle M identified by the navigation device 130, a speed, an acceleration, and an actual velocity around a vertical axis acquired by vehicle sensors mounted in the vehicle, a direction of the vehicle M, and the like. States of the vehicle M includes, for example, a state in which the vehicle M stops, a state in which the vehicle M is traveling, a state in which the vehicle M turns left or right or changes lanes, and the like.

The occupant state analyzer 156 acquires information about the position of an occupant sitting on a seat in the vehicle cabin, a behavior, a line of sight and facial expression change of the occupant by performing analysis processing on an image captured by the in-vehicle camera 112 and extracting characteristic information such as a shape of a person and a face shape. The behavior of the occupant includes, for example, a direction of the face of the occupant, a posture of the body, and the like. The occupant state analyzer 156 may detect the position of an occupant sitting on a seat through a pressure sensor and other detection sensors provided in the seats.

The occupant state analyzer 156 may analyze audio collected through the microphone 114 and determine a state of the occupant from the tone of the analyzed audio or estimate the feeling of the occupant. In a case that there is a plurality of occupants, the occupant state analyzer 156 may identify which occupant is a speaker on the basis of an image capture result of the in-vehicle camera 112 and a result of analysis of audio collected through the microphone 114. The occupant state analyzer 156 is an example of an "interpreter."

The presentation controller 160 controls contents to be presented to an occupant through an agent image on the basis of reply information (e.g., conversation information generated by the server device 200) with respect to audio transmitted from the audio input unit 152 to the server device 200. The contents to be presented to the occupant include, for example, display contents to be output through the display 116, audio contents to be output through the speaker 118, and contents with respect to execution of an application (hereinafter referred to as app) which realizes respective functions in the vehicle.

The presentation controller 160 may control the contents to be presented to the occupant on the basis of the state of the occupant analyzed by the occupant state analyzer 156. The presentation controller 160 may store input information from the occupant and history information of contents which have been presented to the occupant in the storage unit 170 and learn the lifestyle and tastes of the occupant from the stored history information to control presentation contents in accordance with a situation.

The image generator 162 generates an agent image and sets a display 116 which will display the generated agent image and a display position of an image, and the agent image is displayed at the set display position on the display 116. For example, the image generator 162 may generate an agent image having a changed agent facial expression on the basis of contents of audio and contents of reply information. For example, the image generator 162 may generate an agent image having a sad facial expression in a case that a request from an occupant is uncertain and thus re-input of the request is requested and generate an agent image having a delighted facial expression in a case that audio such as "Thank you" is input. The image generator 162 generates an image (hereinafter referred to as a reply image) for displaying reply information on the display 116 and causes the display 116 to display the generated reply image.

The audio generator 164 generates audio for conversation to be output to an occupant. For example, the audio generator 164 may generate audio for locating a sound image at a position associated with the display position of the agent image using one or more speakers 118. Locating a sound image is determining a spatial position of a sound source detected by an occupant by adjusting the magnitude of a sound output from the speaker 118 and delivered to the left and right ears of the occupant, for example. A sound image is determined, for example, on the basis of sound characteristics inherently possessed by a sound source, information on a vehicle cabin environment, and a head-related transfer function (HRTF). The audio generator 164 can locate a sound image at a predetermined position using this principle.

Figure 4:
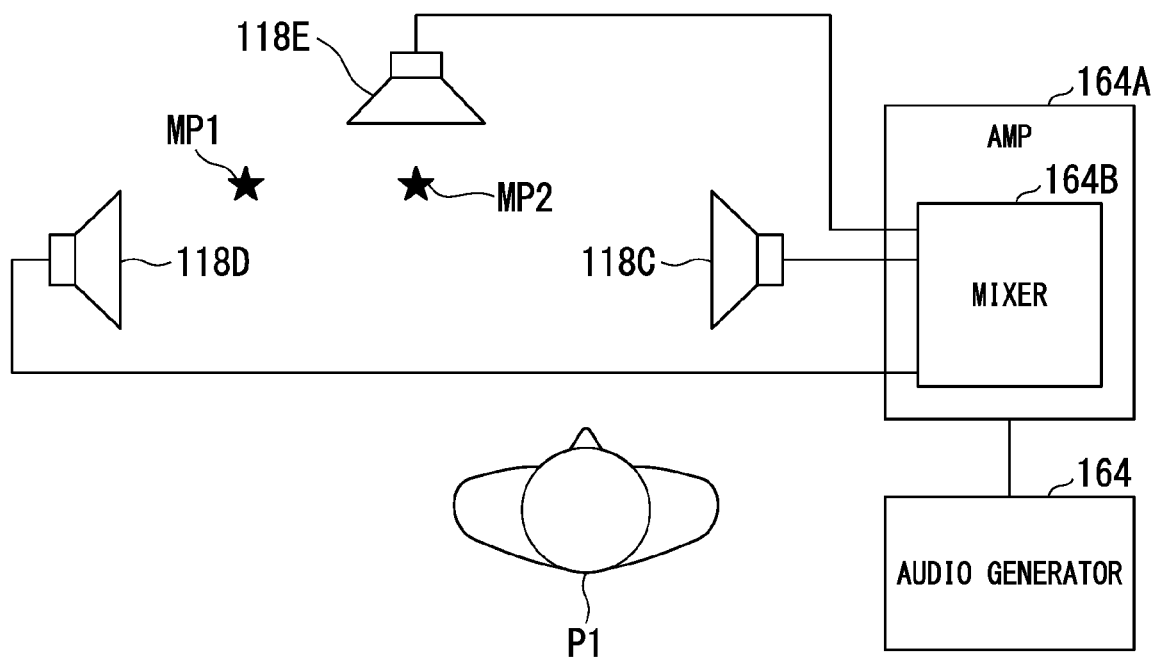
FIG. 4 is a diagram for describing a state in which a position at which a sound image is located is moved.

FIG. 4 is a diagram for describing a state in which a position at which a sound image is located is moved. FIG. 4 illustrates locating a sound image using the above-described speakers 118C to 118E in order to simplify description. In the example of FIG. 4, AMP 164A and a mixer 164B are included between the audio generator 164 and the speakers 118C to 118E. The AMP 164A adjusts the magnitude of a sound output from each of the speakers 118C to 118E under the control of the audio generator 164. For example, the AMP 164A may allow sound adjustment between 0 to 100% with respect to the magnitude (maximum intensity) of a reference sound. The mixer 164B has a function of combining a plurality of input sounds. The mixer 164B has a function of distributing sounds to be output to the speakers 118C to 118E.

For example, in a case in which a sound image is located at a spatial position MP1 shown in FIG. 4, in a case that the AMP 164A performs an output of 5% of a maximum intensity from the speaker 118C, an output of 80% of the maximum intensity from the speaker 118D and an output of 15% of the maximum intensity from the speaker 118E for predetermined audio to be output on the basis of audio generated by the audio generator 164, an occupant P1 feels as if the sound image is located at the spatial position MP1 shown in FIG. 4 at the position of the occupant P1.

In a case that the AMP 164A performs an output of 45% of the maximum intensity from the speaker 118C, an output of 45% of the maximum intensity from the speaker 118D and an output of 45% of the maximum intensity from the speaker 118E for the audio to be output, the occupant P1 feels as if the sound image is located at a spatial position MP2 shown in FIG. 4 at the position of the occupant P1. In this manner, it is possible to change a position of sound image location by adjusting the magnitudes of sounds output from one or more speakers selected from a plurality of speakers three-dimensionally provided in the vehicle cabin.

The application caller 166 calls an application selected by the presentation controller 160 through the storage unit 170 and executes the called application in the agent controller 180 to realize the function of the application. For example, in a case that a telephone application 172 is executed by the agent controller 180, communication with an external terminal having a calling function is performed through the communication device 110 and calling to a terminal holder is realized using the microphone 114 and the speaker 118. In a case that a radio application 174 is executed by the agent controller 180, audio information transmitted from a radio station through a frequency designated by an occupant is acquired through the communication device 110 and a function of outputting the acquired audio information from the speaker 118 is realized. In a case that a navigation application 176 is executed by the agent controller 180, a route guidance function or the like in cooperation with the navigation device 130 is realized.

The storage unit 170 is realized by, for example, an HDD, a flash memory, an electrically erasable programmable read only memory (EEPROM), a read only memory (ROM), a random access memory (RAM), or the like. The storage unit 170 stores, for example, programs read and executed by a processor, such as the telephone application 172, the radio application 174 and the navigation application 176, and other pieces of information.

The agent controller 180 controls execution and suspension of each functional unit of the agent control device 150. For example, the agent controller 180 may receive a request from each functional unit through an application programming interface (API), select a functional unit which executes a process based on the received request and cause the selected functional unit to execute the process through the API.

[Server Device]

The server device 200 includes a communication unit 210, an audio section detector 220, an audio recognizer 230, a natural language processor 240, a conversation generator 250, and a storage unit 260, for example. These components are realized, for example, by a computer processor such as a CPU executing a program (software). Some or all of these components may be realized by hardware (circuit part including circuitry) such as an LSI circuit, an ASIC, a FPGA or a GPU or realized by software and hardware in cooperation. The program may be stored in a storage device (a storage device including a non-transient storage medium) such as an HDD or a flash memory that is the storage unit 170 in advance or stored in a separable storage medium such as a DVD or a CD-ROM and installed in the storage unit 170 in a case that the storage medium is inserted into a drive device.

The communication unit 210 communicates with the agent device 100 through the network NW using a cellular network, Wi-Fi network, Bluetooth, DSRC or the like, for example. The communication unit 210 receives an audio stream transmitted from the agent device 100. The communication unit 210 transmits audio or text information and reply information such as an image generated by the conversation generator 250 to the agent device 100.

The audio section detector 220 detects an audio section from an audio stream transmitted from the agent device 100. For example, the audio section detector 220 may detects an audio section, for example, on the basis of amplitudes and zero crossings of an audio waveform in the audio stream. The audio section detector 220 may perform section detection based on audio/non-audio identification in units of frame based on the Gaussian mixture model (GMM) or perform section detection according to a process of matching with a database for detecting an audio section stored in advance in the storage unit 260 or the like.

The audio recognizer 230 recognizes audio in the audio section detected by the audio section detector 220 and converts the audio into text as text information. The audio recognizer 230 may identify characteristics of a speaker from the audio. Characteristics of a speaker include, for example, a sex, an age, and information on whether the speaker is a driver or a fellow passenger. The audio recognizer 230 may identify a person by checking characteristic information of personal audio stored in a personal profile 264 stored in the storage unit 260.

The audio recognizer 230 may identify characteristic information on the basis of how an occupant calls other occupants or how the occupant is called. In a case that the audio recognizer 230 recognizes that an occupant sitting on the passenger seat calls an occupant sitting on the driver's seat "father," for example, the audio recognizer 230 recognizes that the title of "father" called by the occupant refers to the driver. Further, the agent controller 180 of the agent control device 150 may have this function.

The natural language processor 240 performs a natural language process on text information converted into text by the audio recognizer 230 and interprets the meaning of the text information. The natural language process includes morpheme analysis, syntactic analysis, semantic analysis, context analysis, and the like. Morpheme analysis segments, for example, text information into minimum representation element units having meanings and analyzes a part of speech for each of the segmented units (morphemes), or the like. Syntactic analysis analyzes a sentence construction, for example, on the basis of morphemes obtained through morpheme analysis. Semantic analysis distinguishes unity having a meaning, for example, on the basis of a construction obtained through syntactic analysis. Context analysis interprets a meaning in units of sentence or context, for example.

The natural language processor 240 generates a command associated with an interpreted meaning. For example, in a case that meanings of "How many kilometers to Tokyo station?," "How long does it take to Tokyo station?" and the like have been interpreted as interpretation results, the natural language processor 240 generates a command replaced by standard text information "What is the distance to Tokyo station?." Accordingly, it is possible to easily acquire reply information even in a case that text has variation.

The natural language processor 240 may interpret the meaning of text information, for example, using an artificial intelligence process such as a machine learning process using probability and generate a command based on an interpretation result. The natural language processor 240 refers to commands of reply information 262 stored in the storage unit 260 using the generated command and acquire reply information associated with a matching command.

The conversation generator 250 generates audio for performing a conversation with an occupant on the basis of contents acquired by the natural language processor 240. The conversation generator 250 transmits reply information such as the generated audio (audio stream), text information, and an image from the communication unit 210 to the agent device 100.

The storage unit 260 is realized by, for example, an HDD, a flash memory, an EEPROM, a ROM, a RAM, or the like. The storage unit 260 stores the reply information 262, the personal profile 264 and other pieces of information, for example. The personal profile 264 is information in which audio characteristic information, a sex, an age, a favorite genre, a past history of use of the server device 200, and the like are correlated to personal identification information.

[Initial Display of Agent Image]

Figure 5:
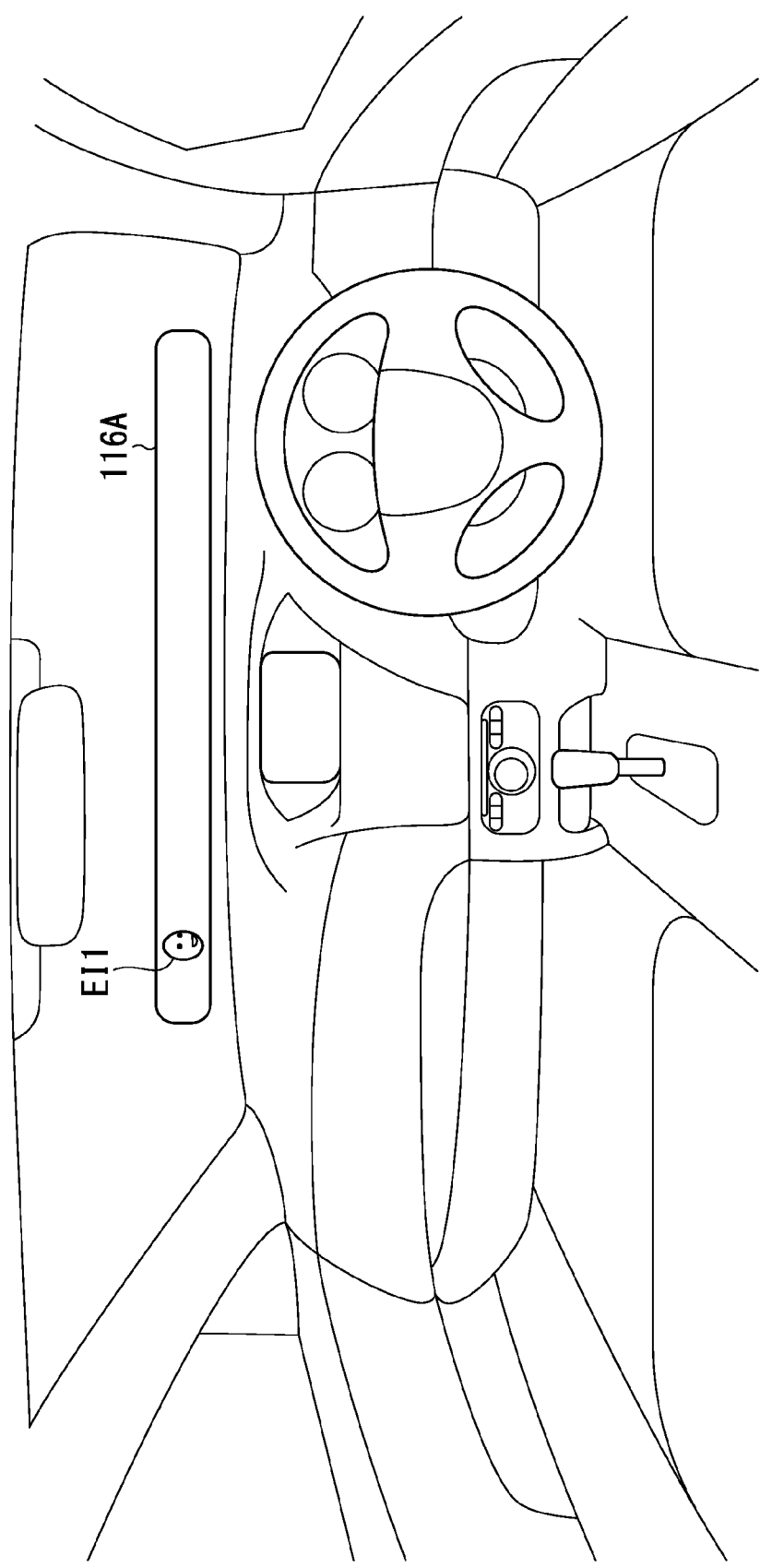
FIG. 5 is a diagram showing an example of display of an agent image on a display.

FIG. 5 is a diagram showing an example of an agent image EI1 displayed by the display 116A. As described above, an agent image includes a face image in which a viewer recognizes an expression or a face direction. In the example shown in FIG. 5, a state in which the agent image EI1 is displayed such that it can be recognized by an occupant in a case that facing in the direction of the center of the cabin is shown.

In a case that an utterance of an occupant detected by the audio input unit 152 includes a word or a phrase that calls an agent as a result of analysis of the utterance according to the occupant state analyzer 156, first, the agent controller 180 sets at least one occupant as a conversation target first before the agent replies to the utterance of the occupant, displays the agent image in a region of the display 116A close to the occupant who is the conversation target in a state in which a face direction is recognizable with the face facing the conversation target, and further locates a sound image at the display position.

Further, in a case that a direction of a speaker can be identified through a sound correction result of the microphone 114, the agent controller 180 regards the identified direction of the speaker as a conversation target. In a case that the direction of the speaker cannot be identified through a sound correction result of the microphone 114, the agent controller 180 may identify the direction of the speaker through an image capture result of the in-vehicle camera 112. In a case that the sex and age of the speaker can be identified by the audio recognizer 230, the agent controller 180 may identify the speaker on the basis of the recognition result and the image capture result of the in-vehicle camera 112.

In a case that there is only an occupant sitting on the driver's seat ST1, the agent controller 180 recognizes the occupant sitting on the driver's seat ST1 as a speaker. In a case that the speaker cannot be identified, the occupant state analyzer 156 may preferentially select an occupant other than the occupant sitting on the driver's seat ST1 as a conversation target. In a case that there is an occupant sitting on the passenger seat ST2, the occupant state analyzer 156 may preferentially select the occupant as a conversation target. Accordingly, the agent controller 180 can determine whether to change a conversation target with reference to a response of the occupant sitting on the passenger seat ST2. Meanwhile, the occupant sitting on the driver's seat ST1 is considered to face a traveling direction or the like of the vehicle M for steering for a long time and to be less likely to watch the agent image. That is, there is a possibility that a response of the occupant sitting on the driver's seat ST1 to whether the face direction of the agent image is correct is not sufficiently acquired. Accordingly, in a case that a speaker cannot be identified, the agent controller 180 preferentially selects the occupant sitting on the passenger seat ST2 as a conversation target.

Figure 6:
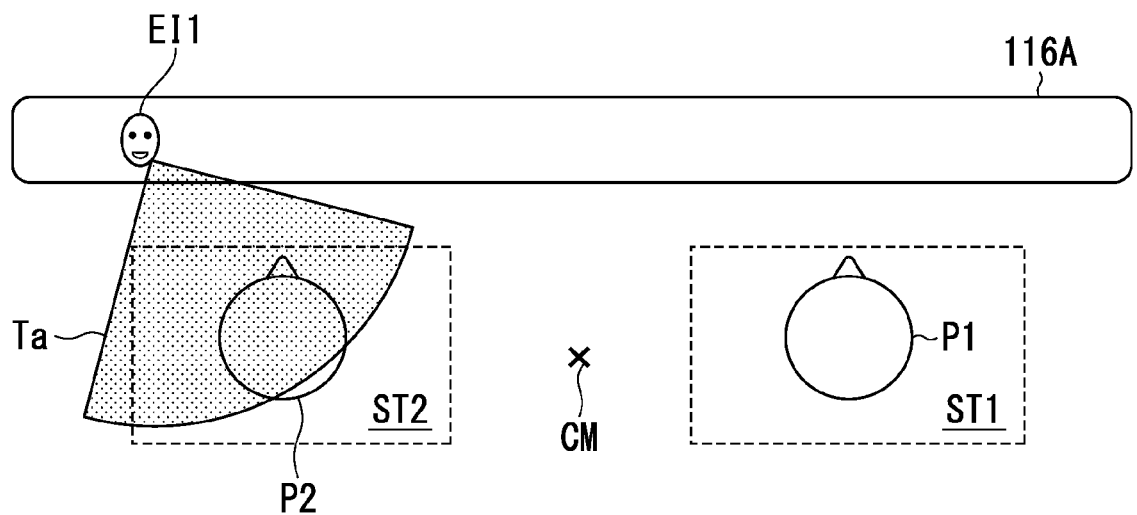
FIG. 6 is a diagram showing a positional relationship between a display of a vehicle and a position at which an occupant sits.

FIG. 6 is a diagram showing a positional relationship between the display 116 of the vehicle M and a position at which an occupant sits. The occupant state analyzer 156 displays the agent image EI1 facing in an arbitrary direction at an end of the display 116 as initial display in a case that a direction of a speaker cannot be identified. The arbitrary direction is, for example, the direction of an area Ta shown in FIG. 6 and a direction having an end of the display 116 at which the agent image EI1 is displayed as a starting point and facing an end on the side at which the agent image EI1 is not displayed.

[Change of Face Direction of Agent Image According to Utterance of Occupant]

The agent controller 180 controls the display 116 such that the face direction of the agent image faces in a direction different from the direction of an occupant who is a conversion target in a case that an utterance of an occupant with respect to the face direction of the agent image is detected by the occupant state analyzer 156 after initial display of the agent image.

For example, an utterance with respect to the face direction of the agent image may be an utterance such as "This side," "Here," "Not that side," "Not there" or the like according to a speaker or an utterance such as "Not me," "It's father" or the like according to an occupant recognized as a conversation target. Repetition of a name (nickname) in a case that the agent image is called may be included in the utterance with reference to the face direction of the agent image. In a case that an occupant's gesture of waving their hands or pointing at other occupants with their finger is detected as a result of interpretation of an image capture result of the in-vehicle camera 112 obtained by the occupant state analyzer 156, the agent controller 180 may interpret the meaning of the gesture and perform control such that the direction of the conversation target is changed to a different direction.

In a case that an increase rate of the sound pressure of audio of an occupant subsequently recognized by the audio input unit 152 is equal to or higher than a predetermined rate in comparison to a sound pressure in a case that the agent is called which has been recognized by the audio input unit 152, the agent controller 180 may interpret the audio as promoting attraction of attention of the agent by the occupant or including an irritated feeling of the occupant and perform control such that the direction of the agent image is changed.

In a case that the agent image is caused to change a conversation target, if a change destination has a specific direction interpreted by the natural language processor 240, the agent controller 180 selects the direction as a conversation target. The specific direction interpreted by the natural language processor 240 is a direction in which an occupant who has detected an utterance such as "This side" of a speaker sits, for example.

In a case that the specific direction is not present and the agent image is caused to change a conversation target, the agent controller 180 may change the agent image such that the agent image faces opposite of the initial conversation target or faces an arbitrary occupant different from the conversation target. In a case that interpretation with respect to the face direction of the agent image has been further performed by the occupant state analyzer 156 after the face direction of the agent image has been changed, the agent controller 180 may control the face direction of the agent image such that it becomes non-directional. Controlling the face direction of the agent image such that it becomes non-directional is controlling the face direction such that it faces a region around the center CM between the driver's seat ST1 and the passenger seat ST2, controlling the face direction such that it faces in the direction of the ceiling of the cabin of the vehicle M, or controlling the face direction such that the agent looks around the vehicle cabin without concentrating the line of sight to one point, for example.

Further, even in a case that the occupant P1 was a speaker, if the occupant P2 starts a conversation with the agent image without showing a response of correcting the face direction of the agent image, the agent controller 180 continuously responds to the occupant P2 as a conversation target.

In a case that the occupant sitting on the passenger seat ST2 has been recognized as a conversation target as a result of analysis of a response of the occupant sitting on the passenger seat ST2 performed by the occupant state analyzer 156, the agent controller 180 causes the audio generator 164 to play a reply audio such as "What do you want?" generated by the conversation generator 250. In a case that the occupant sitting on the driver's seat ST1 has been recognized as a conversation target as a result of analysis of a response of the occupant sitting on the passenger seat ST2 performed by the occupant state analyzer 156, the agent controller 180 changes the face direction of the agent and then causes the audio generator 164 to play a reply audio generated by the conversation generator 250.

Figure 7:
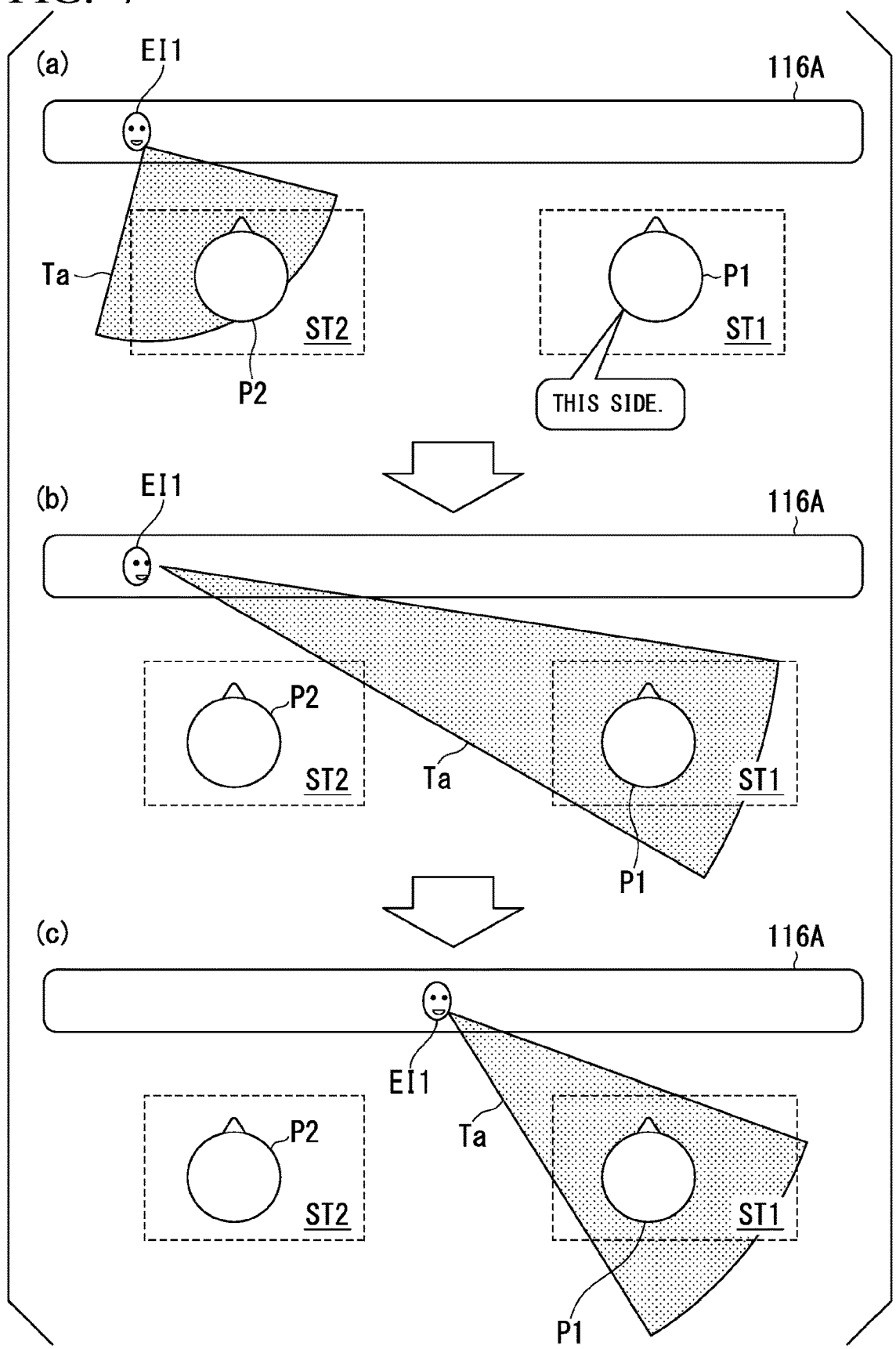
FIG. 7 is a diagram schematically showing a state in which an agent image changes a conversation target.

FIG. 7 is a diagram schematically showing a state in which the agent image EI1 changes a conversation target. In a case that the occupant state analyzer 156 cannot identify which occupant is a speaker although any one of the occupant P1 sitting on the driver's seat ST1 and the occupant P2 sitting on the passenger seat ST2 requests display of the agent image EI1, the agent controller 180 sets the occupant P2 as a conversation target and displays the agent image EI1 such that the face direction faces an area Ta including the passenger seat ST2 as initial display, as shown in FIG. 7(a).

The agent controller 180 interprets a speech of "This side" of the occupant P1 as a speech with respect to the face direction, determines that the conversation target will be changed to the occupant P1, as shown in FIG. 7(b), and changes the face direction of the agent image EI1 such that it faces an area Ta including the driver's seat ST1.

Further, in a case that the agent controller 180 changes the face direction of the agent image EI1, the agent controller 180 may also change the display position of the agent image EI1. For example, in a case that the occupant P1 is performing steering, the occupant P1 is likely to find it difficult to visually recognize the agent image EI1 in a state in which the agent image EI1 is displayed at the left end of the display 116A as shown in FIG. 7(a) and FIG. 7(b). Accordingly, the position at which the agent image EI1 is displayed may be moved to a portion around the center of the display 116A, as shown in FIG. 7(c).

[Processing Flow 1]

Figure 8:
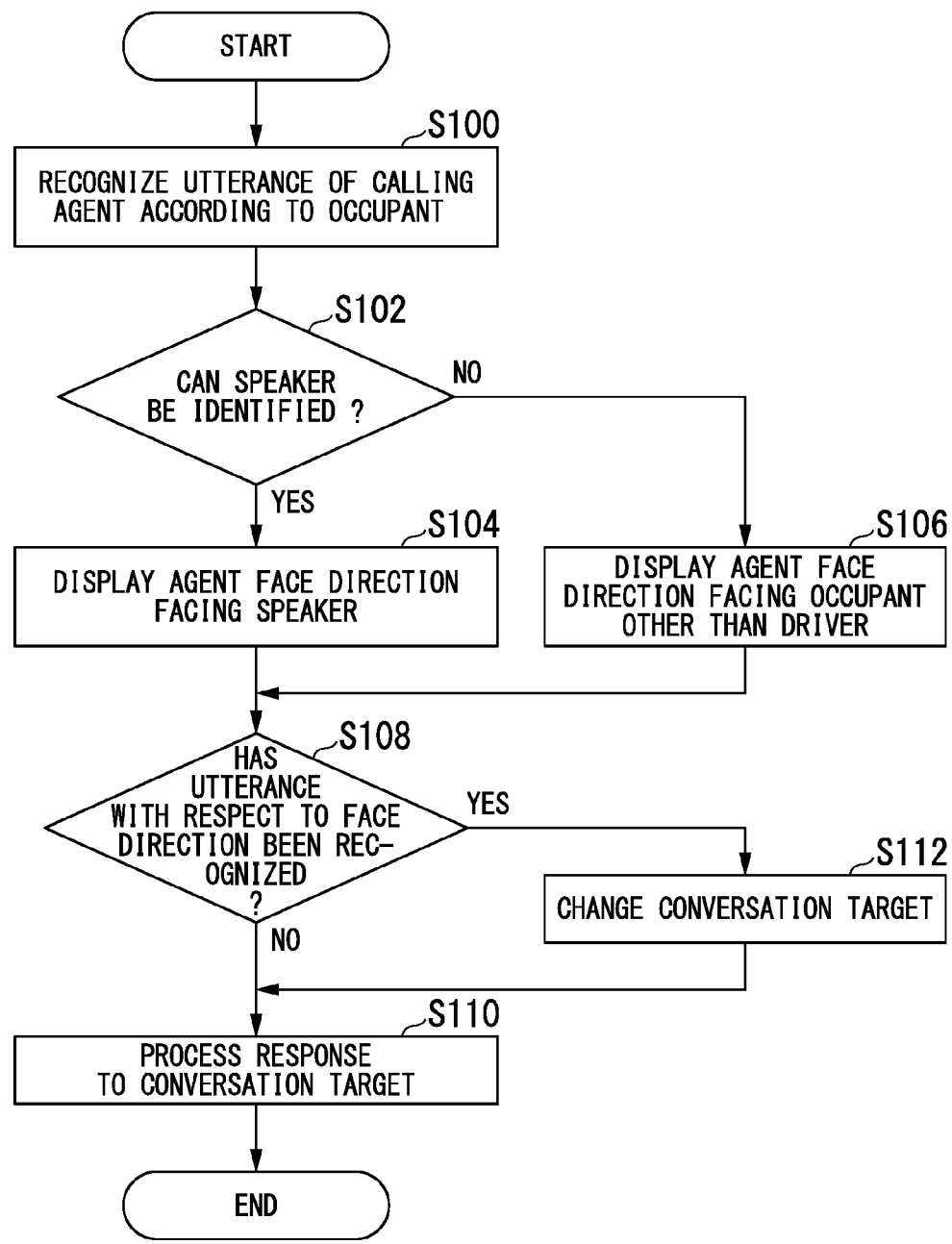
FIG. 8 is a flowchart showing an example of a flow of a process in a case that a speech with respect to a face direction is detected according to the agent device.

Hereinafter, a flow of a series of processes performed by the agent controller 180 will be described using flowcharts. FIG. 8 is a flowchart showing an example of a flow of a process in a case that a speech with respect to a face direction is detected according to the agent device 100.

First, the natural language processor 240 recognizes an utterance of calling the agent image according to an occupant (step S100). Subsequently, the occupant state analyzer 156 determines whether a speaker of audio recognized by the natural language processor 240 can be identified (step S102). In a case that the speaker can be identified, the agent controller 180 controls display of the agent image such that the face direction of the agent image faces the speaker (step S104). In a case that the speaker cannot be identified, the agent controller 180 controls display of the agent image such that the face direction faces an occupant sitting on the passenger seat (step S106).

After the process of step S104 or step S106, the natural language processor 240 determines whether a speech of an occupant with respect to the face direction of the agent image has been recognized (step S108). In a case that the speech with respect to the face direction has not been recognized, a process of responding to a conversation target is performed (step S110). In a case that the speech with respect to the face direction has been recognized, the agent controller 180 changes the conversation target of the agent image (step S112) and performs the process of step S110. Description of the process of this flowchart ends.

[Change of Face Direction of Agent Image According to Facial Expression Change of Occupant]

In a case that the occupant state analyzer 156 analyzes an image captured by the in-vehicle camera 112 and detects a facial expression change of an occupant in a step before the agent speaks after initial display of the agent image, the agent controller 180 controls the display 116 such that the face direction of the agent image faces a direction different from the initial direction. The agent controller 180 also changes the face direction of the agent image in the same manner, for example, in a case that a negative facial expression change of an occupant who is a conversation target, captured by the in-vehicle camera 112, is detected. The negative facial expression change is a facial expression classified as surprise, annoyance or embarrassment, for example. Further, in a case that the occupant has the corresponding facial expression before display of the agent image, the agent controller 180 does not detect that there is a negative facial expression change.

[Processing Flow 2]

Figure 9:
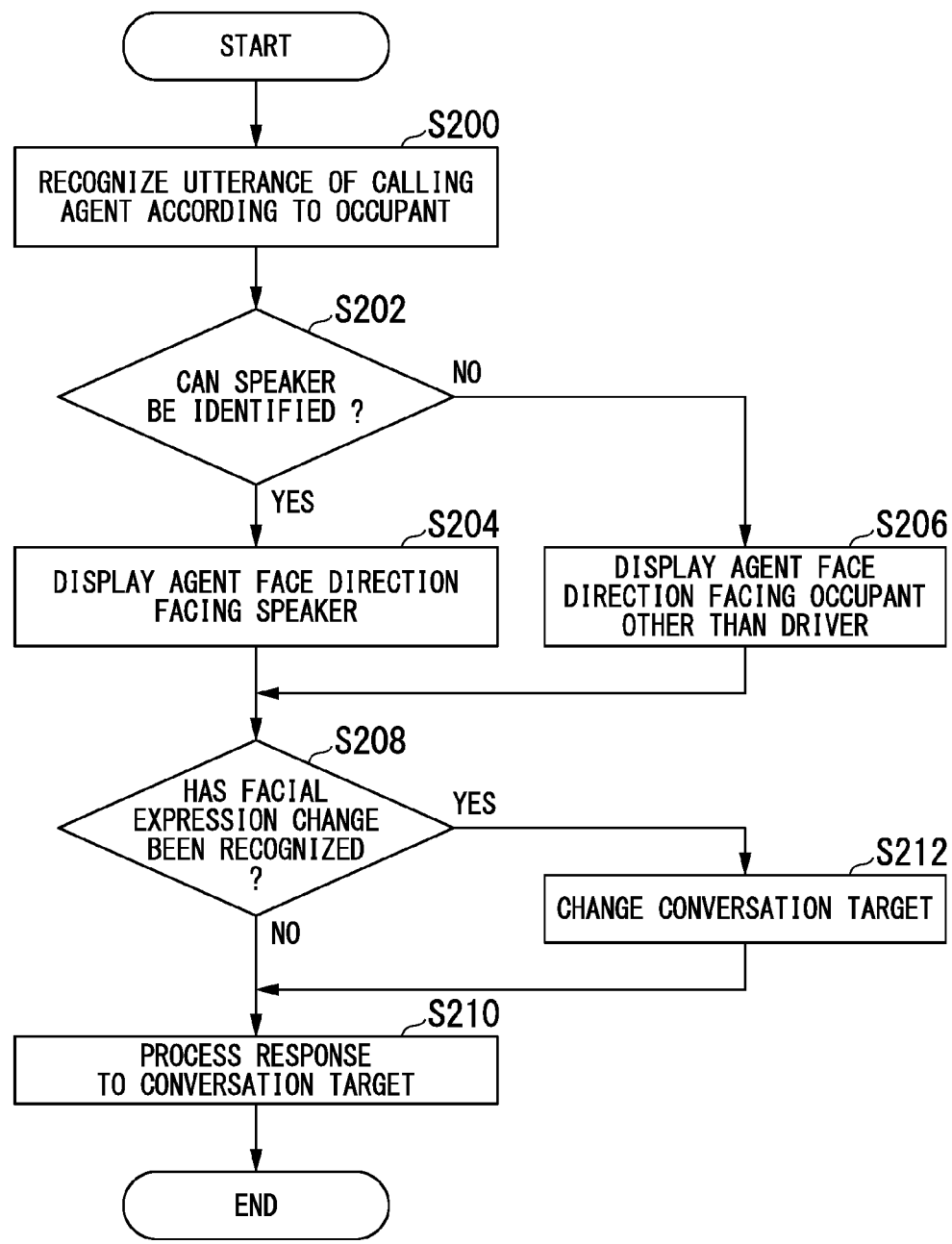
FIG. 9 is a flowchart showing an example of a flow of a process in a case that change in a facial expression is detected according to the agent device.

FIG. 9 is a flowchart showing an example of a flow of a process in a case that change in a face expression is detected according to the agent device 100. Meanwhile, steps S200 to S206 and S210 to S212 of the flowchart shown in FIG. 9 correspond to steps S100 to S106 and S110 to S112 of the flowchart shown in FIG. 8.

First, the natural language processor 240 recognizes an utterance of calling the agent image according to an occupant (step S200). Subsequently, the occupant state analyzer 156 determines whether a speaker of audio recognized by the natural language processor 240 can be identified (step S202). In a case that the speaker can be identified, the agent controller 180 controls display of the agent image such that the face direction of the agent image faces the speaker (step S204). In a case that the speaker cannot be identified, the agent controller 180 controls display of the agent image such that the face direction faces an occupant sitting on the passenger seat (step S206). The agent does not speak yet in any case.

After the process of step S204 or step S206, the occupant state analyzer 156 determines whether a facial expression change of the occupant has been recognized (step S208). In a case that the facial expression change of the occupant has not been recognized, a process of handling a conversation target is performed (step S210). In a case that the facial expression change of the occupant has been recognized, the agent controller 180 changes the conversation target of the agent image (step S212) and performs the process of step S210. Description of the process of this flowchart ends.

[Initial Display of Agent Image in Case of Uncertain Speaker]

Figure 10:
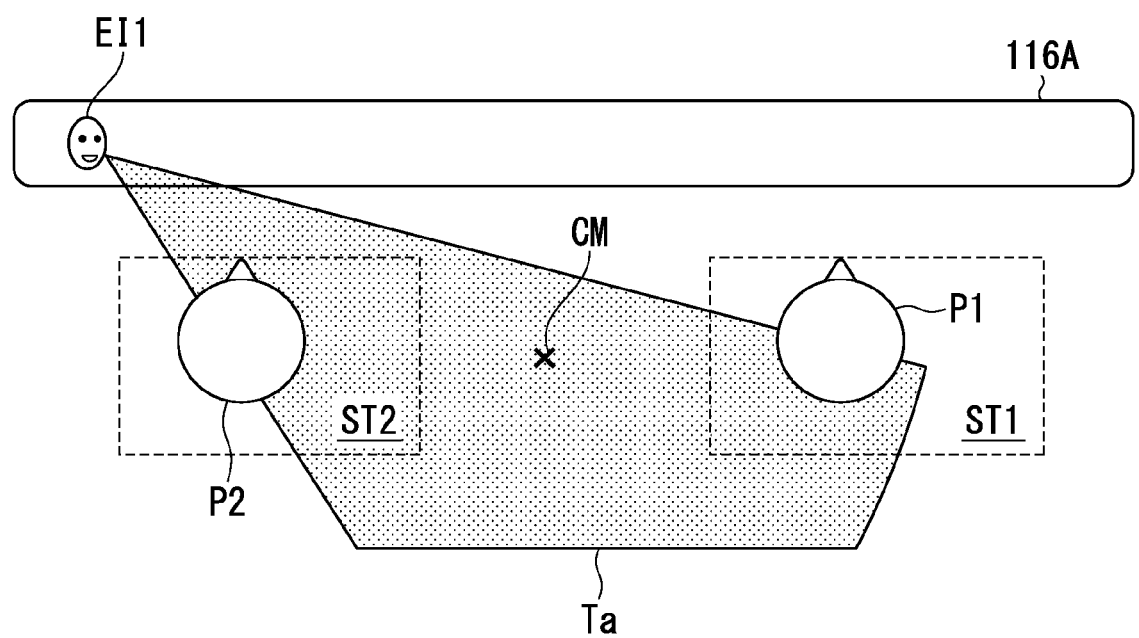
FIG. 10 is a diagram showing an initial display position of an agent image in the case of an uncertain speaker.

FIG. 10 is a diagram showing an initial display position of the agent image EI1 in the case of an uncertain speaker. In a case that which occupant speaks cannot be estimated, the agent controller 180 may display the agent image EI1 such that the agent faces an area Ta including all occupants in the vehicle cabin as a conversation target from an end of the display 116A on the side of the passenger seat, as shown in FIG. 10. In a case that there is no occupant sitting on the passenger seat ST2 and there is an occupant P3 sitting on the back seat ST3, the face direction of the agent image EI1 may be set such that the face direction faces the area Ta on the assumption that the occupant P3 sitting on the back seat ST3 is a conversation target.

[Processing Flow 3]

Figure 11:
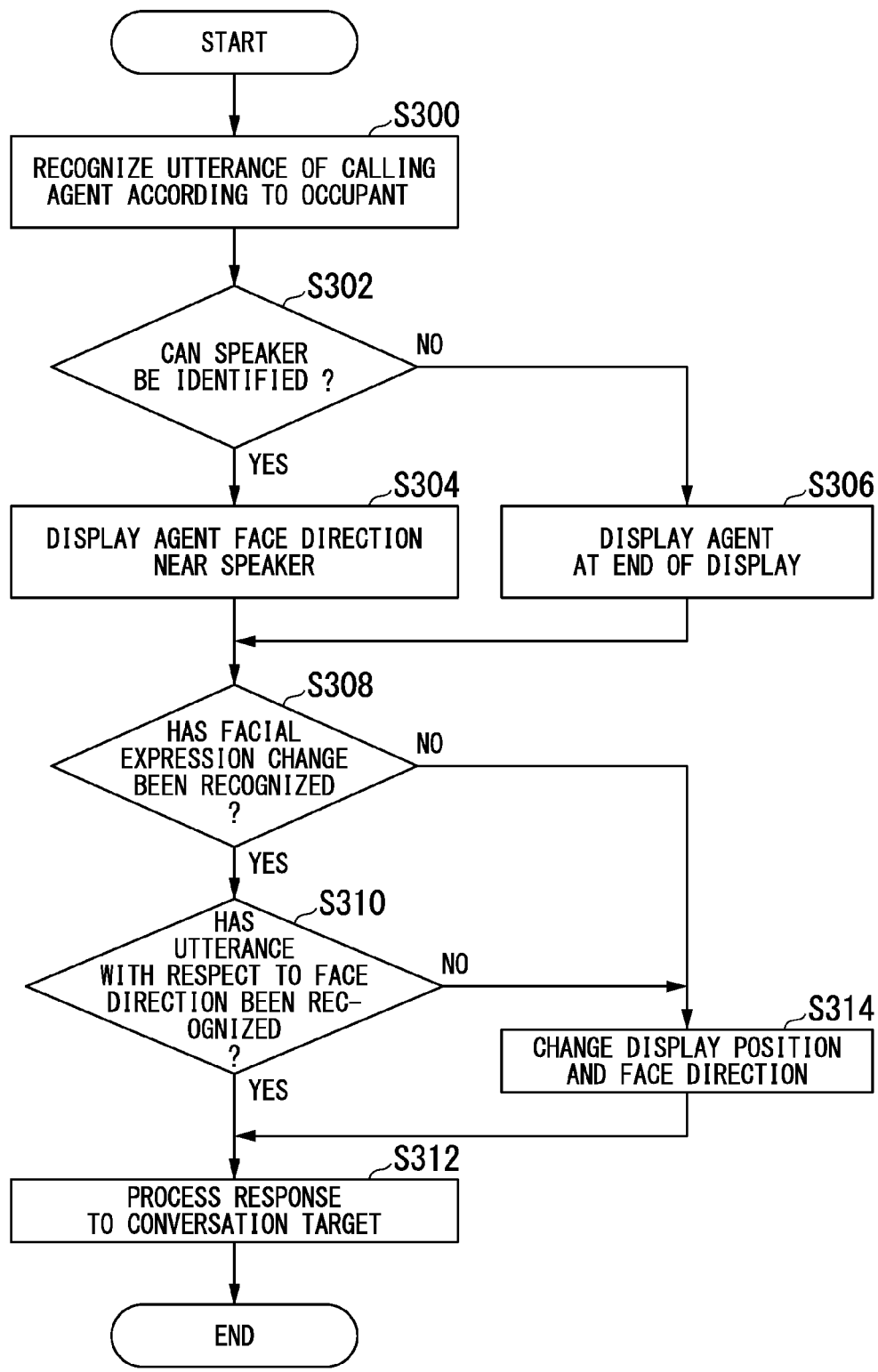
FIG. 11 is a flowchart showing an example of a flow of a series of processes according to the agent device.

FIG. 11 is a flowchart showing an example of a flow of a series of processes according to the agent device 100. Meanwhile, steps S300 to S302 and S310 to S312 of the flowchart shown in FIG. 11 correspond to steps S100 to S102, S108 and S312 of the flowchart shown in FIG. 8, and step S308 of the flowchart shown in FIG. 11 corresponds to step S208 of the flowchart shown in FIG. 9.

First, the natural language processor 240 recognizes an utterance of calling the agent image according to an occupant (step S300). Subsequently, the occupant state analyzer 156 determines whether a speaker of audio recognized by the natural language processor 240 can be identified (step S302). In a case that the speaker can be identified, the agent controller 180 performs control such that the agent image is displayed in a region close to the speaker and the face direction of the agent image faces the speaker (step S304).

In a case that the speaker cannot be identified, the agent controller 180 performs control such that the agent image is displayed at an end of the display 116 (performed control such that the agent image is displayed at the end of the passenger seat in FIG. 10) and the face direction of the agent image faces all occupants (step S306).

After the process of step S304 or step S306, the occupant state analyzer 156 determines whether a facial expression change of the occupant has been recognized (step S308). In a case that the facial expression change of the occupant has not been recognized, the natural language processor 240 determines whether a speech of an occupant with respect to the face direction of the agent image has been recognized (step S310). In a case that the speech with respect to the face direction has not been recognized, the agent controller 180 performs a process of handling a conversation target (S312). In a case that a facial expression of the occupant has been recognized in step S308 or in a case that the speech with respect to the face direction has been recognized in step S310, the agent controller 180 changes a conversation target of the agent image (step S314) and performs the process of step S312. Description of the process of this flowchart ends.

According to the above-described first embodiment, the microphone 114 which collects audio in the vehicle cabin, the speaker 118 which outputs audio to the vehicle cabin, the occupant state analyzer 156 which interprets the meaning of audio collected by the microphone 114, the display 116 provided in the vehicle cabin, and the agent controller 180 which displays an agent image in a form of speaking to an occupant in a region of the display 116 and causes the speaker 118 to output audio are included, and the agent controller 180 can allow the agent to perform a natural behavior by changing the face direction of the agent image to an direction different from the direction of the occupant who is a conversation target in a case that an utterance with respect to the face direction is interpreted by the occupant state analyzer 156 after the agent image is displayed on the display 116.

Second Embodiment

Hereinafter, an agent system 1A according to a second embodiment will be described. In the following description, the same components and functions as those in the first embodiment are assigned the same signs as those in the first embodiment and detailed description thereof is omitted. With respect to components having the same names as those in the first embodiment but having different configurations or functions from those of the first embodiment, "A" is attached to the ends of the signs thereof.

[Initial Display of Agent Image 2]

The agent controller 180A displays the agent image EI1 at an end of the display 116 as initial display, as shown in FIG. 6, and displays the agent image EI1 such that the face direction faces in the direction of the other end of the display 116. This initial display may be performed before the agent controller 180A selects an occupant who is a conversation target of the agent image. In a case that the occupant state analyzer 156 starts analysis of audio collected by the microphone 114 and determines that an utterance of any occupant is highly likely to be any audio input for the agent, for example, the agent controller 180A displays the agent image EI1 at an end of the display 116 on the side of the passenger seat ST2 such that the face direction of the agent image EI1 faces in the direction of an end of the display 116 on the side of the driver's seat ST1.

[Change of Face Direction of Agent Image According to Facial Expression Change of Occupant 2]

In a case that the agent image of initial display is displayed prior to completion of selection of an occupant who is a conversation target, the agent controller 180A completes selection of the occupant who is the conversation target and changes the face direction of the agent image to the direction of the occupant who is the conversation target if the direction of the conversation target is different from the direction of the face direction of the agent image of initial display.

In a step before the agent speaks after initial display of the agent image, the agent controller 180A controls the display 116 such that the face direction of the agent image faces in a direction different from the initial direction in a case that the occupant state analyzer 156 analyzes an image captured by the in-vehicle camera 112 and detects a facial expression change of an occupant. In a case that a negative facial expression change of the occupant who is a conversation target, which has been captured by the in-vehicle camera 112, is detected, for example, the agent controller 180A changes the face direction of the agent image such that it faces in a direction different from the initial direction.

For example, it is assumed that a face direction of the agent image EI1 of initial display is set to the occupant P2 sitting on the passenger seat ST2 and the occupant state analyzer 156 has detected a negative facial expression change of the occupant P2 in a state in which the occupant P1 sitting on the driver's seat ST1 and the occupant P2 sitting on the passenger seat ST2 are recognized as occupants as shown in FIG. 7. In such a case, the agent controller 180A changes the face direction of the agent image EI1 such that the agent faces the occupant P1 sitting on the driver's seat ST1.

[Change of Face Direction of Agent Image in Accordance with Utterance of Occupant]

In a case that the occupant state analyzer 156 detects an utterance of an occupant and the agent replies to the utterance of the occupant, if it is determined that the utterance of the speaker has been interrupted halfway, the agent controller 180A may interpret the interrupted utterance as a wrong conversation partner and perform control such that the conversation partner to be changed.

According to the above-described second embodiment, the agent controller 180A displays the agent image of initial display at one end of the display 116 and changes the face direction of the agent image on the basis of a facial expression change of an occupant or a conversation with the agent image and thus it is possible to allow the agent to perform a natural behavior even in a step in which a conversation target is uncertain in addition to achievement of the same effects as those of the first embodiment.

While preferred embodiments of the invention have been described and illustrated above, it should be understood that these are exemplary of the invention and are not to be considered as limiting. Additions, omissions, substitutions, and other modifications can be made without departing from the spirit or scope of the present invention.

What is claimed is:

1. An agent device comprising:
   a microphone which collects audio in a vehicle cabin;
   a plurality of speakers which output audio to the vehicle cabin;
   an interpreter which interprets the meaning of audio collected by the microphone;
   a display provided in the vehicle cabin; and an agent controller which displays an agent image in a form of speaking to an occupant in a region of the display in a state in which a face direction is recognizable and causes the plurality of speakers to output audio, wherein the agent controller changes the face direction of the agent image to a direction different from a direction of the occupant who is a conversation target in a case that an utterance with respect to the face direction is interpreted by the interpreter after the agent image is displayed on the display, a sound image can be located through a combination of outputs of the plurality of speakers, and the agent controller displays the agent image in an area near the conversation target among one or more displays present in the vicinity of a plurality of occupants and controls the plurality of speakers such that a sound image is located at the display position of the agent image.

2. The agent device according to claim 1, wherein the agent controller preferentially selects the occupant who is not a driver as the conversation target.

3. The agent device according to claim 2, wherein the occupant preferentially selected as the conversation target is an occupant sitting on a passenger seat in the vehicle cabin.

4. The agent device according to claim 1, wherein, in a case that the interpreter further performs the interpretation with respect to the face direction of the agent image after the face direction of the agent image has been changed, the agent controller sets the face direction as non-directional.

5. The agent device according to claim 1, wherein the agent controller changes the face direction in a case that the interpreter interprets that input of a name of the agent image has been repeatedly received.

6. The agent device according to claim 1, wherein the agent controller changes the face direction in a case that an increase rate of the sound pressure of the audio received through the microphone is equal to or higher than a predetermined rate.

7. The agent device according to claim 1, wherein the agent controller changes the face direction in a case that it is determined that an utterance interpreted by the interpreter has been interrupted halfway.

8. The agent device according to claim 1, further comprising a camera which captures an image of the occupants, wherein the interpreter further interprets an image collected by the camera, in a case that speaking of an occupant to the agent image has been recognized, the agent controller displays the agent image in a state in which the agent image faces in at least a direction in which any occupant is present before the agent image replies to speaking of the occupant, the interpreter interprets images collected by the camera before and after the agent image is displayed in a state in which the agent image faces in at least a direction in which any occupant is present, and the agent controller changes the face direction if it is determined that a facial expression of the occupant has changed in a case that the agent image is displayed in a state in which the agent image faces in at least a direction in which any occupant is present.

9. The agent device according to claim 8, wherein the agent controller changes the face direction in a case that a negative facial expression change of the occupant selected as a conversation target has been detected.

10. The agent device according to claim 1, wherein the agent controller displays the agent image at one end of the display and displays the face direction of the agent image such that the face direction faces in a direction of the other end of the display.

11. An agent presenting method using a computer, comprising:
collecting audio in a vehicle cabin;
outputting audio to the vehicle cabin;
interpreting the meaning of the collected audio;
displaying an agent image in a form speaking to an occupant in a state in which a face direction is recognizable and outputting the audio;
changing the face direction of the agent image to a direction different from a direction of the occupant who is a conversation target in a case that an utterance with respect to the face direction is interpreted after the agent image is displayed;
locating a sound image through a combination of outputs of a plurality of speakers; and
displaying the agent image in an area near the conversation target among one or more displays present in the vicinity of a plurality of occupants and controlling the plurality of speakers such that a sound image is located at the display position of the agent image.

12. An agent device comprising:
a microphone which collects audio in a vehicle cabin;
a speaker which outputs audio to the vehicle cabin;
an interpreter which interprets the meaning of audio collected by the microphone;
a display provided in the vehicle cabin;
a camera which captures an image of occupants; and
an agent controller which displays an agent image in a form of speaking to an occupant in a region of the display in a state in which a face direction is recognizable and causes the speaker to output audio, wherein the agent controller changes the face direction of the agent image to a direction different from a direction of the occupant who is a conversation target in a case that an utterance with respect to the face direction is interpreted by the interpreter after the agent image is displayed on the display, the interpreter further interprets an image collected by the camera, in a case that speaking of an occupant to the agent image has been recognized, the agent controller displays the agent image in a state in which the agent image faces in at least a direction in which any occupant is present before the agent image replies to speaking of the occupant, the interpreter interprets images collected by the camera before and after the agent image is displayed in a state in which the agent image faces in at least a direction in which any occupant is present, and the agent controller changes the face direction if it is determined that a facial expression of the occupant has changed in a case that the agent image is displayed in a state in which the agent image faces in at least a direction in which any occupant is present.

13. An agent presenting method using a computer, comprising:
collecting audio in a vehicle cabin;
outputting audio to the vehicle cabin;
interpreting the meaning of the collected audio;
displaying an agent image in a form speaking to an occupant in a state in which a face direction is recognizable and outputting the audio;

changing the face direction of the agent image to a direction different from a direction of the occupant who is a conversation target in a case that an utterance with respect to the face direction is interpreted after the agent image is displayed;
capturing an image of occupants by a camera,
further interpreting an image collected by the camera,
in a case that speaking of an occupant to the agent image has been recognized, displaying the agent image in a state in which the agent image faces in at least a direction in which any occupant is present before the agent image replies to speaking of the occupant,
interpreting images collected by the camera before and after the agent image is displayed in a state in which the agent image faces in at least a direction in which any occupant is present, and
changing the face direction if it is determined that a facial expression of the occupant has changed in a case that the agent image is displayed in a state in which the agent image faces in at least a direction in which any occupant is present.

\* \* \* \* \*